United States Patent [19]
Hoffman

[11] Patent Number: 4,601,487
[45] Date of Patent: Jul. 22, 1986

[54] ACTUATOR FOR PROTECTIVE ROLL BAR
[76] Inventor: Harry W. Hoffman, 879 Heather Dr., San Carlos, Calif. 94070
[21] Appl. No.: 670,041
[22] Filed: Nov. 13, 1984
[51] Int. Cl.⁴ .................. B60R 21/02; B60R 27/00
[52] U.S. Cl. ............................. 280/756; 296/205
[58] Field of Search .............. 280/756; 296/102, 210, 296/190, 205; 180/271

[56] References Cited
U.S. PATENT DOCUMENTS
3,918,740 11/1975 Notestine ........................ 280/756
4,202,565 5/1980 Mosch ............................ 280/756
4,362,220 12/1982 Baston ........................... 280/756

Primary Examiner—Richard A. Bertsch
Attorney, Agent, or Firm—T. R. Zegree

[57] ABSTRACT

An actuating device for protective roll bar fastened to a side hoop installed in a motor vehicle comprises, in combination, a slidable tubular sleeve, a coil spring cooperating therewith and a releasable latching means. The device permits an easy and rapid exit or access to the vehicle. The roll bar combined with the device offers increased safety for a passenger in the vehicle in case of an accident.

16 Claims, 5 Drawing Figures

ACTUATOR FOR PROTECTIVE ROLL BAR

BACKGROUND OF THE INVENTION

The present invention generally relates to an actuator for protective roll bar installed in certain types of motor vehicles. More particularly, the invention relates to an actuator with a locking device adapted for mounting on a protective roll bar installed on at least one side of the occupant compartment inside a motor vehicle provided with a roll cage which enables the protective roll bar to be moved to an open position and returned to a locked closed position.

Passenger motor vehicles with a high vertical profile and those used in rugged terrain or in racing competitions have an increased susceptibility to rolling over, thereby subjecting the vehicle occupants to a high risk of injury. Therefore, attempts have been made in recent years to equip some of such vehicles with protective roll bars on the side of the occupant compartment in the interior of the vehicle for the primary purpose of preventing the occupants from being thrown out of the vehicle through the open side during a roll-over. Conversely, the absence of a protective roll bar on the side of such vehicles subjects the occupants to an even higher risk of serious injury. The same is true when the protective roll bar structure is mounted inside the roof and side walls of a vehicle, for example a racing type vehicle having a hard top. During a roll-over accident, the vehicle doors frequently fly open. Thus when there are no protective roll bars on the side of a vehicle, a potential risk of serious and sometimes fatal injury to the occupants exists. The main reason why many motor vehicles have not been equipped with a protective roll bar on the side of the driver and passenger side is the inconvenience of being forced to climb over the roll bar each time the occupant of the vehicle has to get in or out therefrom.

Consequently, a need exists for a protective roll bar structure capable of being moved easily to an open position to allow the occupant to enter or get out from the vehicle conveniently without having to climb over the side roll bar and also being capable of being moved back to a locked closed position thereby offering the protective function of an objectionable stationary roll bar. The device of this invention provides a new approach to the structure of protective roll bars as it includes certain new and distinct features not heretofore known in the art.

OBJECTS OF THE INVENTION

In view of the foregoing, the principal object of the invention is to provide an actuator for use in conjunction with a protective roll bar capable of protecting a vehicle occupant from being crushed or otherwise injured by objects or other vehicles colliding with the side of the vehicle.

Another object of the invention is the provision of a means adapted to protect vehicle occupants from being thrown out the side of a vehicle during a roll-over accident.

A further object of the invention is to provide an actuating means for a side roll bar to secure protection to the occupant riding in a motor vehicle during a collision while facilitating rapid exit from the vehicle.

Still another object of the invention is to provide a highly effective manually operated actuator for a protective roll bar of the character described which can easily be manufactured in volume quantities from readily available materials.

BRIEF SUMMARY OF THE INVENTION

These and other objects of the present invention will become more fully apparent from the following description taken in conjunction with the accompanying drawing.

In accordance with the invention, there is provided an actuator assembly adapted for use on a protective roll bar secured to a front hoop of a motor vehicle, said actuator being operatively positioned on said roll bar, comprising in combination: (a) a slidable tubular sleeve; (b) a coil spring in contact with one end of said sleeve; and (c) a releasable latching means mounted within said roll bar adjacent said end of said sleeve for permitting said roll bar to be moved outwardly to an open position and returned to a closed position.

The front hoop is formed by a generally upright front member and an upright rear member joined by a horizontal top member connected to the tops of said front and rear members to form an integral rigid structure of substantially inverted U-shape. The roll bar comprises, in combination, a first elongated tubular member pivotally attached to said front member, a second relatively short tubular member rigidly connected to said rear member, said tubular members having spaced apart distal ends. A slidable tubular sleeve engages said distal end portions of said first and said second tubular members thereby forming a substantially continuous, disengageable, rigid protective side roll bar.

A coil spring is mounted over the rear portion of said first tubular member in abutting contact with said tubular sleeve for urging said sleeve into slidable engagement with said second tubular member.

A releasable latching means is fixedly mounted within said distal end of said first tubular member for securely locking together said two tubular members.

BRIEF DESCRIPTION OF THE DRAWINGS

In the accompanying drawing, wherein like reference characters designate corresponding elements throughout the views thereof.

DETAILED DESCRIPTION OF THE INVENTION

Figure 1:
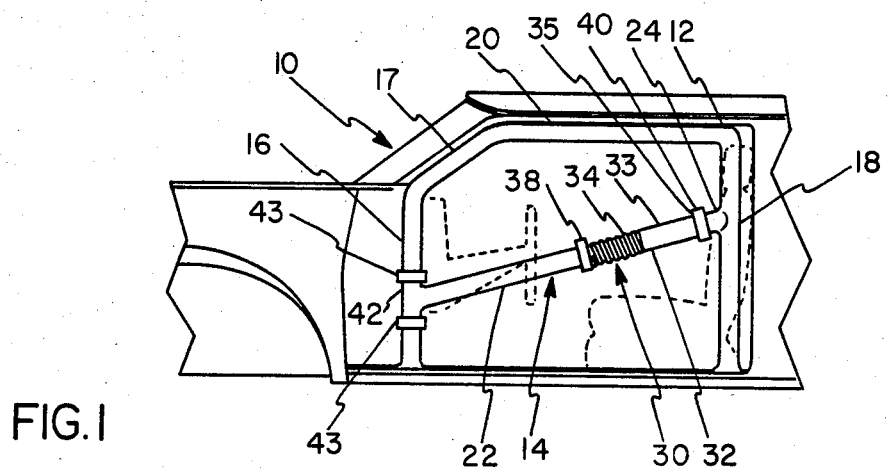
FIG. 1 is a side elevational view of the actuator of the present invention mounted on a protective roll bar in the closed position in a motor vehicle, the fragmentary view of which is shown in dashed lines.

Referring now to the drawings, FIG. 1 illustrates schematically, by way of an example, a motor vehicle 10 equipped with a front hoop 12 and a protective metal roll bar structure, generally designated 14, which includes the actuator 30 of the invention in combination therewith. It will be noted that the directions and positions, such as forward, rearward, front, rear, etc. as used herein are in relation to the motor vehicle. The protective tubular roll bar 14 made from a rigid metal tube or pipe basically comprises an elongated first tubular member 22 which is connected to a second relatively short tubular member 24 by a slidable sleeve 32. Another sleeve 42 having a pair of guide collars 43 is mounted rotatably on the generally vertical lower portion of upright front member 16 of the front hoop 12 and connected to tubular member 22. The tubular member 24 is rigidly connected to the upright rear member 18 of hoop 12 in such a way that when the first tubular member 22 is laterally moved to an end-to-end position with the second tubular member 24, the two members 22 and 24 form a substantially continuous straight in-line roll bar which is inclined upwardly in rearward direction of vehicle 10. The surfaces of both distal ends 26 and 28 of tubular members 22 and 24 are substantially parallel to each other and spaced apart to provide a clearance therebetween of about ¼ inch to ⅜ inch. Front hoop 12 which is secured to the floor of vehicle 10 further includes a generally horizontal top member 20 joining the upper portions of members 22 and 24. The upper portion 17 of front member 16 is inclined rearwardly.

Referring now to FIGS. 2 through 5, the details of the invention are depicted. Releasable latching means 36 for securely locking together spaced apart tubular members 22 and 24 is mounted fixedly within the distal end portion of tubular member 22. Sleeve 32 having a rear end 35, front end 33 and a cylindrical bore therethrough is slidably mounted on tubular member 22. The inner diameter of sleeve 32 is slightly greater than the outer diameters of first and second tubular members 22 and 24, the latter diameters being substantially the same. A metal collar 38 is rigidly secured to the first tubular member 22, preferably by welding.

Figures 3, 4, 5:
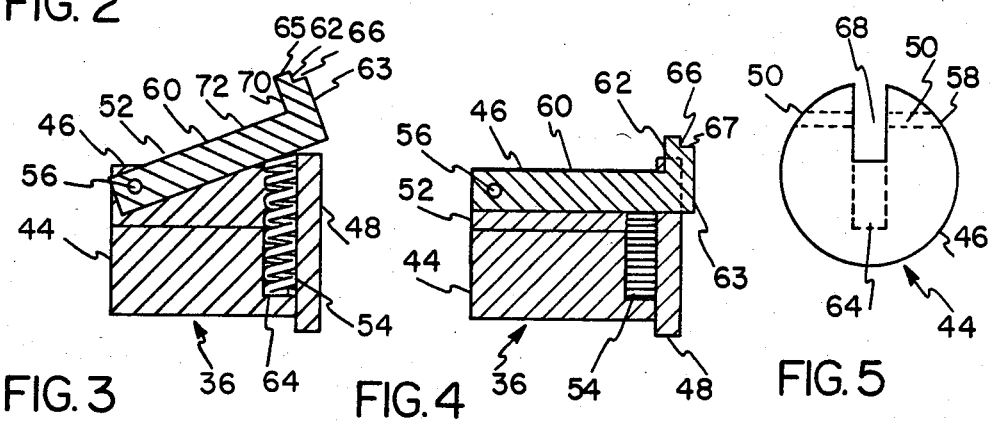
FIG. 3 is an enlarged plan sectional view of the latching means with its coil spring in relaxed position.
FIG. 4 is a view similar to FIG. 3 but showing the coil spring in compressed position.
FIG. 5 is an end view of the end piece viewed in the direction of the distal end of the second tubular member showing the passageway for a pin and a bore for the coil spring in dashed lines.

Latching means 36 comprising an end piece 44 made of suitable metal or rigid plastic material, as shown in FIGS. 3, 4 and 5, is mounted within the distal end 26 of the first tubular member 22 so that the outer cylindrical surface 46 of end piece 44 is press-fit into the bore of tubular member 22 until the flange 48 on end piece 44 contacts the distal end surface of tubular member 22. The end piece 44 is fastened to tubular member 22 by one or more anchor pins (not shown) or the like fasteners by passing through a pair of aligned holes (not shown) in the side wall of tubular member 22. The anchor pins are hammered in the side walls of the tubular member 22 so as not to interfere with the sliding movement of sleeve 32 mounted thereon. An alternative method of mounting end piece 44 in tubular member 22 is to use a press fit with sufficient interference to prevent relative movement.

A latch in the form of a L-shaped lever 52 having a leg 60 and an arm 62, as shown in FIGS. 3 and 4, is pivotally mounted in slot 68 within end piece 44. Lever 52 is mounted on anchor pin (not shown) which passes through passageway 58 formed by a pair of aligned holes 50 in the side walls thereof as well as through a pair of holes 56 in elongated leg 60 of lever 52 likewise aligned therewith. Lever 52 has a short arm 62 having a flat portion 70 which is substantially perpendicular to the flat surface 72 of leg 60. When lever 52 is pivotally connected to end piece 44 in slot 68, the short arm 62 will also be substantially perpendicular to the axis of tubular member 22. This is important, as is noted hereinbelow, since the function of arm 62 is to provide a stop and a safety catch for sleeve 32. The free end of arm 62 has a step-down L-shaped recess 66, the height of which from top to bottom is preferably equal to the wall thickness of tubular members 22 and 24 which are preferably made of the same type and size of steel tube or pipe.

A second, relatively small coil spring 54 is positioned in its relaxed form in the cylindrical bore 64 of end piece 44 and extends radially inwardly therein from the bottom of bore 64 to the outer surface 46 of end piece 44. Coil spring 54 and lever 52 are mounted in place in the end piece 44 before it is fitted and fastened to the distal end 26 of tubular member 22 as described hereinabove. Coil spring 54 urges lever 52 against inner side wall of tubular member 22 so that, when said tubular member 22 is moved into alignment with second tubular member 24, contact between lever 52 and tubular member 24 causes lever 52 to move radially inwardly toward the center of tubular member thereby releasing the planar edge of sleeve 32 so that it is slidably moved into engagement with tubular member 24.

Figure 2:
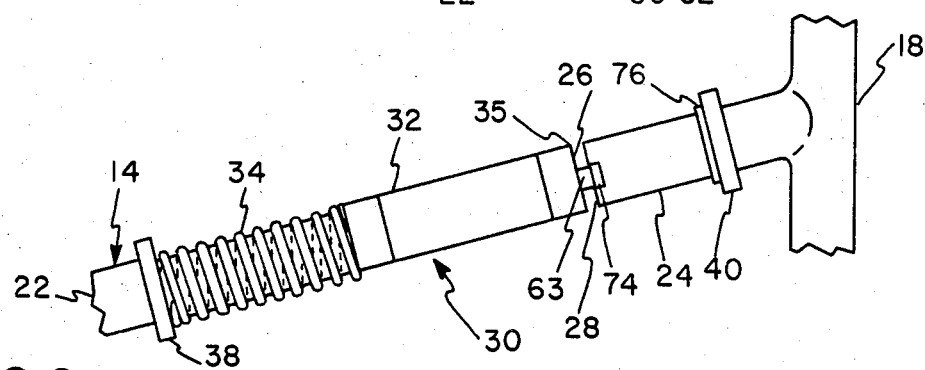
FIG. 2 is a detailed enlarged fragmentary side elevational view of the actuator mounted on the protective roll bar in disconnected position with the coil spring in compressed form and portions of the roll bar and upright rear member cut away.

As illustrated in FIG. 2, the second tubular member 24 has a notch 74 in the tube wall at its distal end 28. Notch 74 is sufficient in size to allow the portion of the arm 62 having rear portion 63 which protrudes rearwardly beyond the outer surface of flange 48 of the end piece 44 to clear the short tubular member 24 when the elongated tubular member 22 is moved toward a closed, end to end position with tubular member 24.

A rigid collar 38 is affixed around the circumferential surface of tubular member 22, preferably by welding. First coil spring 34 is positioned on tubular member 22 between the front end 33 of sleeve 32 and collar 38 in abutting contact with sleeve 32. When tubular member 22 is in the closed, end to end, position, coil spring 34 urges sleeve 32 rearwardly against stop ring 40. To open or disengage the tubular member 22, a pulling force by hand must be applied to sleeve 32 to urge it against coil spring 34 which compresses until the rear of sleeve 32 is at least flush with the distal end 26 of tubular member 22.

By moving tubular member 22 outwardly from the vehicle 10 by means of rotatable sleeve 42, lever 52 is freed to pivot around anchor pin inserted through holes 56. Spring 54 then urges lever 52 against the inner side wall of tubular member 22 until the rear flat portion 70 of arm 62 engages the rear end 35 of sleeve 32 thereby holding sleeve 32 in the retracted position. To close and lock tubular member 22, it is swingingly moved back toward the vehicle. As tubular member 22 approaches alignment with tubular member 24, surface 67 of recess 66 in arm 62 strikes the interior side wall of short tubular member 24 forcing lever 52 downwardly until front flat portion 70 of arm 62 in lever 52 disengages the rear end 35 of sleeve 32. Thus coil spring 34 urges sleeve 32 rearwardly over tubular member 24 causing tubular member 22 to be locked rigidly in place. Stop ring 40 is mounted on tubular member 24 to limit the travel of sleeve 32.

To prevent sleeve 32 from coming off the tubular member 22 in the event the latching means 36 should disengage while tubular member 22 is in open position, the projecting end portion 65 of arm 62 acts as stopper by holding the rear edge of sleeve 32 in place substantially flush with the rear surface of the flange 48 of end piece 44. A resilient O-ring 76 made of rubber or rubber-like material is positioned on tubular member 24 adjacent stop ring 40 to reduce the impact of the rear edge of sleeve 32 when it becomes automatically disengaged by spring 34 to its relaxed position.

It will be apparent from the foregoing description of the invention in its preferred embodiment that I have devised a novel actuating means for a protective roll bar used in certain types of motor vehicles, especially in racing cars, stock cars, four-wheel drive trucks, vans and the like to prevent serious injuries to drivers and passengers in the event of an accident. The actuator of this invention may also be useful for certain types of gates in fences provided with protective roll bars.

The actuator described herein is characterized by a new combination of structural elements which is highly advantageous for its basic function, i.e. to permit an occupant of a motor vehicle equipped with a protective roll bar a convenient and rapid exit or access to the vehicle. The mechanism of the actuator permits the roll bar to be maintained in fixed, locked position when the vehicle is driven thereby providing a greater safety factor and protection for the driver and passenger in case of an emergency.

It will be understood that various modifications in the form or in the constructional details of the invention as herein described may be made without departing from the spirit thereof or the scope of the claims which follow.

I claim:

1. An actuator assembly adapted for use with a protective roll bar secured to a front hoop of a motor vehicle, said roll bar comprising a first tubular member and a spaced apart second tubular member, said actuator being operatively positioned on said roll bar, comprising in combination:
   (a) a slidable tubular sleeve connecting end-to-end said first tubular member with said second tubular member thereby forming a substantially continuous straight roll bar;
   (b) a coil spring positioned on said first tubular member in contact with an end of said sleeve; and
   (c) a releasable latching means mounted within said roll bar adjacent said end of said sleeve for permitting said roll bar to be moved outwardly to an open position and returned to a closed position.

2. The actuator of claim 1, wherein said protective roll bar with said actuator mounted thereon is inclined upwardly in rearward direction of said vehicle.

3. In a motor vehicle having secured thereto a front hoop formed by a generally upright front member and an upright rear member joined by a horizontal top member, a protective roll bar comprising a first elongated tubular member pivotally attached to said front member, a second, relatively short tubular member rigidly connected to said rear member, said tubular members having spaced apart distal ends, the improvement comprising: an actuator comprising in combination:
   (a) a slidable, tubular sleeve for engaging said distal ends of said first and second tubular members thereby forming a substantially continuous, disengageable, rigid protective roll bar;
   (b) a first coil spring mounted over rear portion of said first tubular member in abutting contact with said tubular sleeve for urging said sleeve into slidable engagement with said second tubular member; and
   (c) a releasable latching means fixedly mounted within the distal end of said first tubular member for locking securely together said tubular members.

4. The actuator of claim 3, wherein the inner diameter of said tubular sleeve is slightly greater than the outer diameter of said first and second tubular members.

5. The actuator of claim 3, wherein the outer diameters of said first and second tubular members are substantially the same.

6. The actuator of claim 3, wherein said first coil spring has compression sufficient to hold said sleeve firmly on said tubular members when in relaxed or compressed position.

7. The actuator of claim 3, wherein said latching means releases automatically said sleeve for engagement with said second tubular member when said first tubular member is moved into alignment with said second tubular member.

8. The actuator of claim 3, wherein said distal ends of said tubular members are spaced apart by a clearance of about ¼ inch to about ⅜ inch.

9. The actuator of claim 3, wherein a rigid collar is mounted around circumferential surface of said first tubular member adjacent the front end of said first coil spring.

10. The actuator of claim 3, wherein a stop ring is secured to front distal end of said second tubular member adjacent the rear end of said tubular sleeve.

11. The actuator of claim 3, wherein said latching means comprises an end piece, an L-shaped lever pivotally mounted within said end piece and a second coil spring urging said L-shaped lever against inner side wall of said first tubular member so that, when said first tubular member is moved into alignment with said second tubular member, contact between said lever and said second tubular member causes said lever to move radially inwardly toward the center of said first tubular member thereby releasing the planar edge of said sleeve so that said sleeve is slidably moved into engagement with said second tubular member.

12. The actuator of claim 11, wherein said second coil spring is positioned in a cylindrical bore in said end piece and extends radially inwardly within said end piece from bottom of said bore.

13. The actuator of claim 11, wherein said arm of said L-shaped lever comprises an L-shaped recess at the free end thereof.

14. The actuator of claim 11, wherein said end piece comprises a pair of aligned holes in side walls thereof.

15. The actuator of claim 14 wherein said L-shaped lever comprises an elongated leg and a short arm, said leg having a pair of holes positioned in alignment with the holes in said side walls for passage of an anchor pin.

16. The actuator of claim 15, wherein said arm in said L-shaped lever provides a stop and a safety catch for said tubular sleeve.

* * * * *